J. R. STORIE.
PIPE COUPLING.
APPLICATION FILED MAY 7, 1920.
1,368,985.
Patented Feb. 15, 1921.
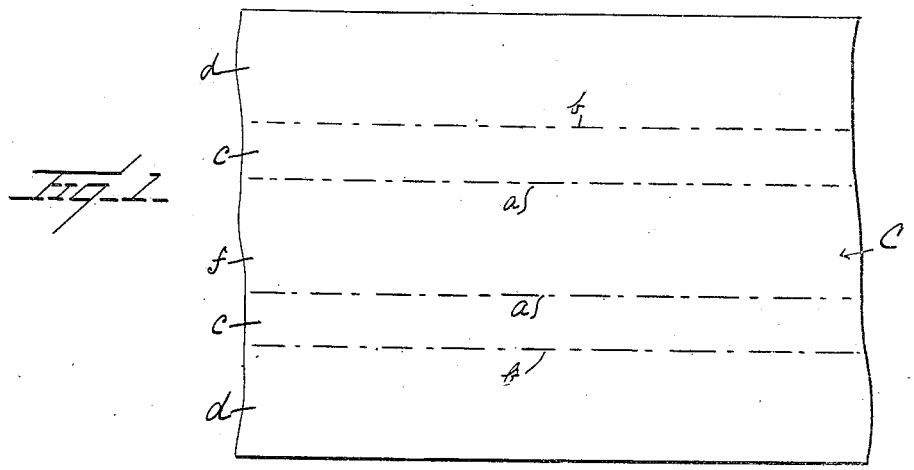
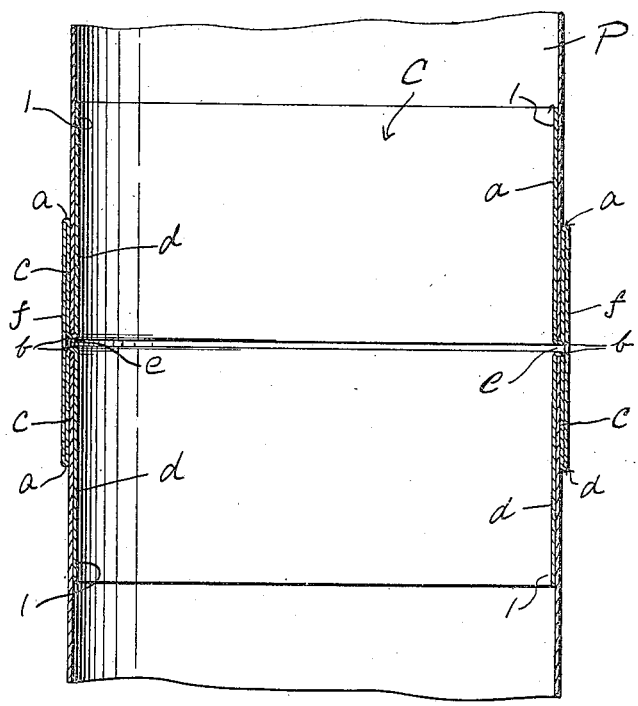
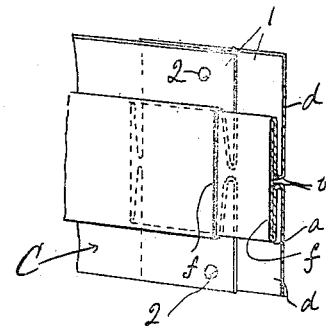
Inventor
I. R. Storie
By Watson E. Coleman
Attorney

UNITED STATES PATENT OFFICE.

ISAAC R. STORIE, OF JAMESTOWN, TENNESSEE.

PIPE-COUPLING.

1,368,985.

Specification of Letters Patent.   Patented Feb. 15, 1921.

Application filed May 7, 1920. Serial No. 379,663.

*To all whom it may concern:*

Be it known that I, ISAAC R. STORIE, a citizen of the United States, residing at Jamestown, in the county of Fentress and State of Tennessee, have invented certain new and useful Improvements in Pipe-Couplings, of which the following is a specification, reference being had to the accompanying drawings.

This invention relates to certain improvements in pipe coupling and has relation more particularly to a device of this general character especially designed and adapted for use in connection with stove pipe, or the like, and it is an object of the invention to provide a novel and improved coupling of this general character wherein adjacent pipes or pipe sections are effectively maintained in assembled relation.

It is also an object of the invention to provide a novel and improved coupling of this general character wherein the same may be readily and effectively applied in working position by an unskilled person and which coupling serves effectually to maintain the adjacent end portions of the pipes or pipe sections in desired relation.

Another object of the invention is to provide a novel and improved coupling of this general character embodying a tubular member, preferably cylindrical, provided substantially midway its length with oppositely disposed and circumferentially arranged flanges and which flanges in connection with the body portion of the coupling operate to effect the requisite connection between the adjacent end portions of pipes or pipe sections.

The invention consists in the details of construction and in the combination and arrangement of the several parts of my improved coupling whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in plan of a blank from which a pipe coupling constructed in accordance with an embodiment of my invention is adapted to be produced;

Fig. 2 is a fragmentary sectional view taken through a coupling constructed in accordance with an embodiment of my invention and in applied position; and Fig. 3 is a fragmentary view in perspective of the meeting ends of the completed coupling as herein set forth.

As disclosed in the accompanying drawings, C denotes a pipe coupling constructed in accordance with an embodiment of my invention and which is particularly adapted for use in connection with stove pipe sections.

The coupling C is preferably produced from an oblong sheet of metal folded throughout its entire length along the parallel lines $a$ in predetermined spaced relation and positioned at the transverse central portion of the sheet. The sheet is then folded along the lines $b$ outwardly of the lines $a$ and in parallelism therewith. In practice, the portions $c$ of the sheet between adjacent lines $a$ and $b$ are disposed in superposed relation with respect to the central portion of the sheet or that portion between the lines $a$. The material $d$ outwardly of the lines $b$ is folded in an opposite direction or in a direction away from the adjacent line of fold $a$. By this means, the sheet has extending longitudinally thereof, at its transverse center, the oppositely directed flanges 1 with the restricted space $e$ between the lines of the fold $b$ bridged by the portion $f$ between the lines of fold $a$.

After the material or sheet has been folded in the manner just described, the sheet is curved longitudinally into cylindrical form with one end portion of the flanges 1 slightly telescoping between the portions $c$ and the central portion $f$ at the opposite end portions of the device. Rivets 2, or other fastening members, are disposed through the overlapping ends of the marginal portions of the sheet and through the overlapping portions $d$ so that the sheet or coupling is effectively maintained in complete form.

In practice, one of my improved couplings is adapted to be interposed between the adjacent ends of the pipe or pipe sections P with an end portion of each of said pipe or pipe sections frictionally engaging around an end portion of the coupling and inwardly of a flange 1.

A particular advantage of my improved coupling is its extreme simplicity and the minimum of cost, together with the further advantage of construction whereby the same may be applied in working position by an unskilled person and also whereby the coupling, when applied, effectively connects and maintains connected the adjacent end portions of the pipe or pipe sections P.

From the foregoing description, it is thought to be obvious that a coupling constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. As an article of manufacture a pipe coupling consisting of a sheet of material having its intermediate portion plaited upon the sheet to provide oppositely extending flanges, whereby the flanges of one end may be disposed within the corresponding flanges of the other end when the sheet is curved in cylindrical form.

2. As an article of manufacture a pipe coupling consisting of a sheet of material having its intermediate portion extended upwardly to provide a neck and then outwardly in opposite directions to provide opposed flanges, said sheet having its longitudinal edges extended toward each other whereby one end of said neck is inserted within the opposite end of said neck and the flanges of the first mentioned end of the neck inserted into the flanges of the second mentioned end of the neck.

In testimony whereof I hereunto affix my signature.

ISAAC R. STORIE.